(12) United States Patent
Winzeler et al.

(10) Patent No.: US 9,737,920 B2
(45) Date of Patent: Aug. 22, 2017

(54) METHOD AND APPARATUS FOR EXTRACTING CONTAMINANTS FROM SOIL AND FROM ANIMAL MANURE

(76) Inventors: Dennis D. Winzeler, Bryan, OH (US);
Patrick J. Stein, Edon, OH (US)

( * ) Notice: Subject to any disclaimer, the term of this patent is extended or adjusted under 35 U.S.C. 154(b) by 0 days.

(21) Appl. No.: 11/359,987

(22) Filed: Feb. 22, 2006

(65) Prior Publication Data
US 2006/0228231 A1    Oct. 12, 2006

Related U.S. Application Data

(60) Provisional application No. 60/654,857, filed on Feb. 22, 2005, provisional application No. 60/654,858, filed on Feb. 22, 2005.

(51) Int. Cl.
*B01D 1/00* (2006.01)
*B01D 1/14* (2006.01)
(Continued)

(52) U.S. Cl.
CPC .............. *B09C 1/06* (2013.01); *B01D 1/0011* (2013.01); *B01D 1/0094* (2013.01); *B01D 1/14* (2013.01); *B01D 3/101* (2013.01); *B01D 3/106* (2013.01); *B01D 3/346* (2013.01); *B09B 3/00* (2013.01); *B09B 3/0083* (2013.01); *C02F 1/043* (2013.01);
(Continued)

(58) Field of Classification Search
CPC . B09B 3/00; B09B 3/0083; B09C 1/06; C02F 1/04; C02F 1/043; C02F 1/048; C02F 1/18; C02F 11/185; C02F 2103/005; C02F 2103/20; B01D 1/0011; B01D 1/0082; B01D 1/0094; B01D 1/14; B01D 1/2881; B01D 1/2896; B01D 3/007; B01D 3/008;
(Continued)

(56) References Cited

U.S. PATENT DOCUMENTS 4,140,478 A * 2/1979 Kawakami et al. .......... 202/136
4,728,517 A   3/1988 Markham et al.
(Continued)

OTHER PUBLICATIONS

Chemical Engineering Handbook, 5th ed., Perry et al., (1973), pp. 6-19 through 6-21.*

*Primary Examiner* — Lucas Stelling
(74) *Attorney, Agent, or Firm* — MacMillan, Sobanski & Todd, LLC

(57) ABSTRACT

An apparatus for extracting contaminants from a contaminated material, such as contaminated soil and animal manure, includes an extraction tank having an interior, a heating element that is adapted heat the contaminated material to a temperature where contaminants in the contaminated material are released therefrom to the interior of the extraction tank, and an agitator that is adapted to agitate the contaminated material as it is being heated by the heating element. The apparatus also includes an air pump that generates a series of positive pressure air pulses at an outlet thereof and a series of negative pressure air pulses at the inlet thereof. The apparatus further includes one or more contaminant retaining mechanisms, such as a sediment holding tank, a fluid holding tank, and a gas filter. The interior of the extraction tank, the air pump, and the contaminant retaining mechanisms are connected in a closed loop air circulation system such that the contaminants that are released from the contaminated material are stored in the contaminant retaining mechanisms.

15 Claims, 5 Drawing Sheets

(51) Int. Cl.
  *B01D 3/10* (2006.01)
  *B01D 3/34* (2006.01)
  *B01D 3/42* (2006.01)
  *B09B 3/00* (2006.01)
  *B09C 1/06* (2006.01)
  *C02F 1/04* (2006.01)

(52) U.S. Cl.
  CPC ............ *C02F 1/048* (2013.01); *B01D 1/0082* (2013.01); *B01D 3/42* (2013.01)

(58) Field of Classification Search
  CPC . B01D 3/02; B01D 3/10; B01D 3/101; B01D 3/106; B01D 3/346; B01D 3/42
  USPC ....... 210/175, 180, 194, 179, 188, 174, 173, 210/170.08, 181; 203/3, 98, 94, DIG. 5; 119/161; 202/109, 152, 163, 175, 176, 202/177, 182, 185.1, 200, 234; 405/128.8, 128.85; 4/111.1, 111.6
  See application file for complete search history.

(56) References Cited

U.S. PATENT DOCUMENTS

| | | | |
|---|---|---|---|
| 4,941,822 A | 7/1990 | Evans et al. | |
| 5,121,699 A | 6/1992 | Frank | |
| 5,135,611 A * | 8/1992 | Cameron | 202/200 |
| 5,174,864 A * | 12/1992 | Arbizzani et al. | 202/175 |
| 5,199,212 A | 4/1993 | Newcomb | |
| 5,200,033 A | 4/1993 | Weitzman | |
| 5,273,355 A | 12/1993 | May et al. | |
| 5,325,795 A | 7/1994 | Nelson et al. | |
| 5,425,923 A | 6/1995 | Swisher, Jr. et al. | |
| 5,455,173 A | 10/1995 | Crawford et al. | |
| 5,482,402 A | 1/1996 | Nelson | |
| 5,516,975 A | 5/1996 | Takazawa | |
| 5,548,611 A | 8/1996 | Cusick et al. | |
| 5,662,050 A | 9/1997 | Angelo, II et al. | |
| 5,702,499 A | 12/1997 | Timmenga | |
| 5,724,901 A | 3/1998 | Guy et al. | |
| 5,868,940 A | 2/1999 | Gurfinkel | |
| 5,904,904 A | 5/1999 | Swanson | |
| 5,981,266 A | 11/1999 | Srivastava et al. | |
| 5,984,992 A | 11/1999 | Greer et al. | |
| 6,039,532 A * | 3/2000 | McConnell | 415/119 |
| 6,159,263 A | 12/2000 | Greer et al. | |
| 6,368,500 B1 * | 4/2002 | Asa et al. | 210/173 |
| 6,555,359 B2 | 4/2003 | Cummings | |
| 6,589,422 B2 * | 7/2003 | Low | 210/259 |
| 6,758,879 B2 | 7/2004 | Greer et al. | |
| 2001/0013238 A1 | 8/2001 | Greer et al. | |
| 2003/0059927 A1 | 3/2003 | Cummings | |
| 2004/0120867 A1 | 6/2004 | Dahms et al. | |
| 2004/0232007 A1 | 11/2004 | Carson et al. | |
| 2005/0039508 A1 | 2/2005 | Burnham et al. | |
| 2005/0279146 A1 | 12/2005 | Greer et al. | |

* cited by examiner

METHOD AND APPARATUS FOR EXTRACTING CONTAMINANTS FROM SOIL AND FROM ANIMAL MANURE

CROSS-REFERENCE TO RELATED APPLICATIONS

This application claims the benefit of U.S. Provisional Application No. 60/654,857, filed Feb. 22, 2005, and of U.S. Provisional Application No. 60/654,858, filed Feb. 22, 2005. The disclosures of both of these applications are incorporated herein by reference.

BACKGROUND OF THE INVENTION

This invention relates in general to methods and apparatuses for the remediation of contaminated soil and animal manure. In particular, this invention relates to an improved method and apparatus for extracting contaminants from contaminated soil and from animal manure.

It is widely recognized that industrial production throughout the years has produced numerous environmentally hazardous sites throughout the country and the world that can pose substantial health hazards to the population. In recent years, efforts to clean up or remediate environmentally contaminated sites have increased dramatically. Many methods and apparatuses have been devised for cleaning up or disposing of environmental contamination in water, air, and soil. However, the magnitude of the environmental contamination is enormous in comparison to the resources made available to solve this problem.

To address the problem of contamination from industrial production, and particularly soil contamination, a variety of soil treatment and decontamination techniques have been developed. These techniques involve, but are not limited to, the application of fluids, biological agents, heat, vacuum, pressurized gases, and mechanical agitation. In order to remediate contaminated soil, it is often necessary to apply several different treatment techniques, either individually or in a certain combination and order, that is usually determined by the particular contaminant or contaminants under remediation. Many environmental companies continue to use the conventional methods of "treating" contaminated soil by either off site disposal to landfills or incinerators or displacing it for treatment or mobile injection treatment units. Most technologies were designed for a specific contaminant for a specific site and, therefore, have limited value and associated extensive limitations. Thus, it would be desirable to provide an improved method and apparatus for extracting industrial production contaminants from soil.

In addition to the contaminated soil that has been generated by industrial production, the modem practices of animal husbandry has been found to generate waste products that also require remediation. In many instances, modem animal husbandry involves the establishment and operation of relatively large concentrated animal feeding facilities. The disposition of animal manure from such relatively large concentrated animal feeding facilities has been found to be problematic because of the vast amounts of animal manure that is generated. In many instances, such animal manure is collected in large waste lagoons that are annoying at best and can pose substantial health hazards to the population at worst. Thus, it would be desirable to provide an improved method and apparatus for extracting contaminants from such animal manure for safe disposition.

SUMMARY OF THE INVENTION

This invention relates to an improved method and apparatus for extracting contaminants from contaminated soil and from animal manure. The apparatus includes an extraction tank having an interior that is adapted to receive a contaminated material. The extraction tank includes a heating element that is adapted heat the contaminated material to a temperature where contaminants in the contaminated material are released therefrom to the interior of the extraction tank. The extraction tank further including an agitator that is adapted to agitate the contaminated material as it is being heated by the heating element. The apparatus also includes an air pump that generates a series of positive pressure air pulses at an outlet thereof and a series of negative pressure air pulses at the inlet thereof. The apparatus further includes one or more contaminant retaining mechanisms, such as a sediment holding tank, a fluid holding tank, and a gas filter. The interior of the extraction tank, the air pump, and the contaminant retaining mechanisms are connected in a closed loop air circulation system such that the contaminants that are released from the contaminated material are stored in the contaminant retaining mechanisms.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
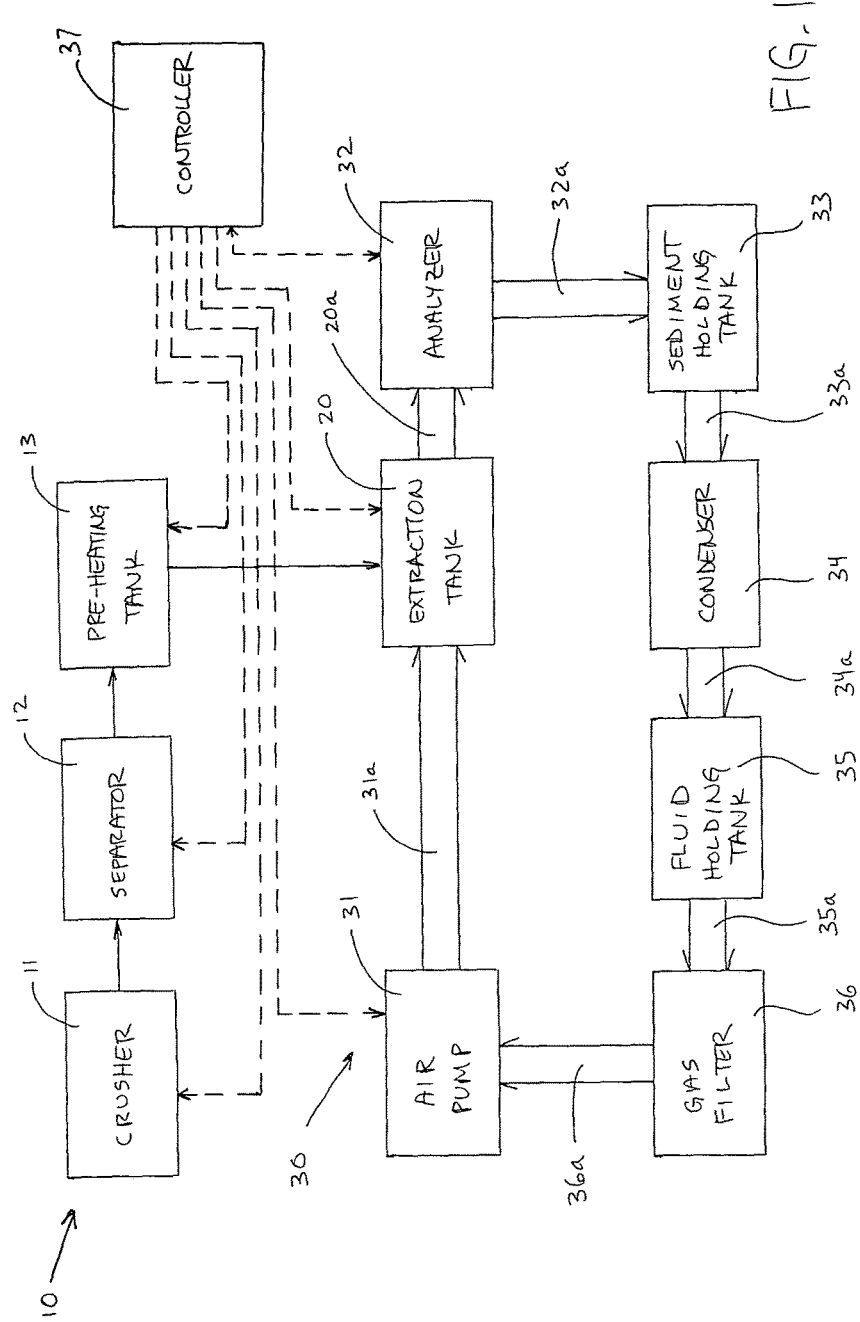
FIG. 1 is a block diagram of an apparatus for extracting contaminants from contaminated soil in accordance with this invention.

Referring now to the drawings, there is illustrated in FIG. 1 an apparatus, indicated generally at 10, for extracting contaminants from soil in accordance with this invention. As will be explained in greater detail below, the apparatus 10 is designed to receive and process soil removed from an area of ground so as to remove any foreign debris and contaminants therefrom. As a result, the clean soil can be returned to the area of ground, and the foreign debris and contaminants removed from the soil can be safely stored or destroyed. The apparatus 10 of this invention is particularly well suited for removing contaminants resulting from industrial production from the soil, including volatile and non-volatile organic components. The apparatus 10 can, for example, be used to extract organic constituents from contaminated soil sediments, sludge, and other debris. Also, contaminants such as solvents, PCBs, dioxin, crude oil, and mercury metal, can be removed from the soil. These contaminants, as well as other contaminants, can then be stored in a sealed storage tank for safe disposal or destruction. The apparatus 10 is a totally sealed system, preventing any detectable emissions from being undesirably expelled into the atmosphere.

To accomplish this, this apparatus 10 provides a thermally enhanced soil waste vapor extraction system with a pulsed pressure hot air sparging, rotary agitation mechanism, the structure and operation of which will be explained in detail below. This waste vapor extraction is accomplished through thermal enhancement of the soil, additionally with elevated temperature and pulse pressure air sparging. The pulse pressure sparging is accomplished with hot air being circulated through the apparatus 10 in a series of positive air pressure pulses alternated with a series of negative air pressure pulses (i.e., vacuum), all incorporated into a sealed or closed loop system. The rotary agitation of the soil provides a way to lift and roll the soil in combination with elevated air temperature and sparging to extract contaminants from soil. The rotation of the contaminated soil facilitates the uniform heating thereof. If desired, the entire apparatus 10 can be provided as a prefabricated unit that can be transported by flatbed trucks or other vehicle, thereby providing a highly mobile, relatively uncomplicated system that can be rapidly configured and assembled at a remote location.

As shown in FIG. 1, the apparatus 10 of this invention includes a crusher 11 that is adapted to receive a quantity of contaminated soil (not shown) from an area of ground. The crusher 11 may be embodied as any mechanism that is capable of breaking up the contaminated soil (and any non-soil foreign debris that might be contained in such contaminated soil) into pieces that are no larger than a predetermined size or volume. The quantity of contaminated soil can be transported to and disposed within the crusher 11 in any desired manner. For example, the quantity of contaminated soil can be transported to and disposed within the crusher 11 by means of a conventional bucket, auger or conveyor. The apparatus 10 of this invention will be explained and illustrated in the context of a batch approach to the remediation of the contaminated soil, i.e., an approach where discrete amounts of the contaminated soil are transported to and disposed within the crusher 11, such as by a bucket, and subsequently processed throughout the apparatus 10. However, it is contemplated that the apparatus 10 of this invention may be used to remediate the contaminated soil in a continuous manner, such as by an auger or conveyor, wherein a continuing or uninterrupted flow of contaminated soil is passed through the various components of the apparatus 10. The crusher 11 can process the quantity of contaminated soil through a screen (not shown), where the size or volume of the pieces can be precisely controlled.

The apparatus 10 also includes a separator 12, which receives the crushed contaminated soil and foreign debris from the crusher 11. The separator 12 may be embodied as any mechanism that is capable of separating the non-soil foreign debris (or any portion thereof) from the contaminated soil. For example, the separator 12 may include a conventional magnetic separating structure that is capable of removing ferrous and other magnetic materials from the contaminated soil by means of magnetic energy. Regardless of its specific nature, the non-soil foreign debris that is separated from the contaminated soil can be removed from the separator 12 and stored or disposed of in any conventional manner, such as by storage in a landfill.

The apparatus 10 further includes a pre-heating tank 13, which receives the contaminated soil from the separator 12. The pre-heating tank 13 may be embodied as any mechanism that is capable of preliminarily heating the contaminated soil to a predetermined temperature. The purpose of the pre-heating tank 13 is to dry the contaminated soil if such contaminated soil is initially high in water content. To accomplish this, the pre-heating tank 13 may include one or more electric heating elements. Such electric heating elements have been found to be preferred over combustible fuel heating elements because the electric heating elements do not generate any combustion waste products. The temperature to which the contaminated soil is preliminarily heated may be selected as desired. However, it is contemplated that the temperature of the contaminated soil is raised up to near, but not at, a magnitude where some or all the contaminants in the soil are released therefrom into the pre-heating tank 13. For example, it has been found to be desirable to preliminarily heat the contaminated soil to a temperature of approximately 140° F. or higher.

The apparatus 10 additionally includes an extraction tank 20 that receives the pre-heated contaminated soil from the pre-heating tank 13. The extraction tank 20 may be embodied as any mechanism that is (1) capable of heating the contaminated soil in presence of a pulsed pressure, hot air sparging flow of air to a predetermined temperature, and (2) agitating the heated contaminated soil in combination with elevated air temperature and pulsed pressure sparging to facilitate the uniform heating thereof. As a result, contaminants in the soil are released from the soil into the enclosed interior of the extraction tank 20.

Figure 2:
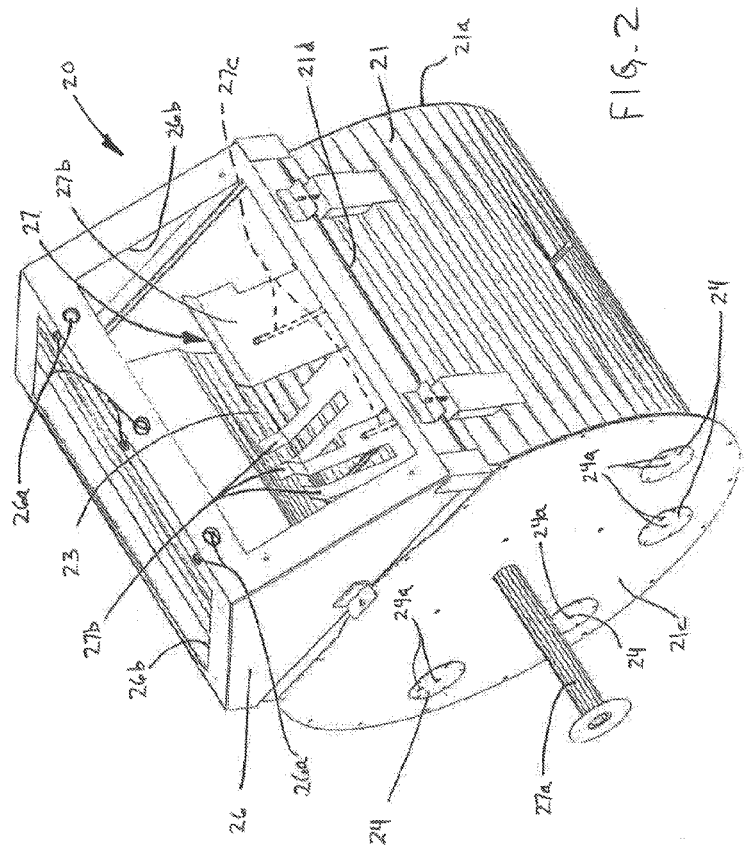
FIG. 2 is a perspective view of an extraction tank for the apparatus for extracting contaminants from soil illustrated in FIG. 1.
Figure 3:
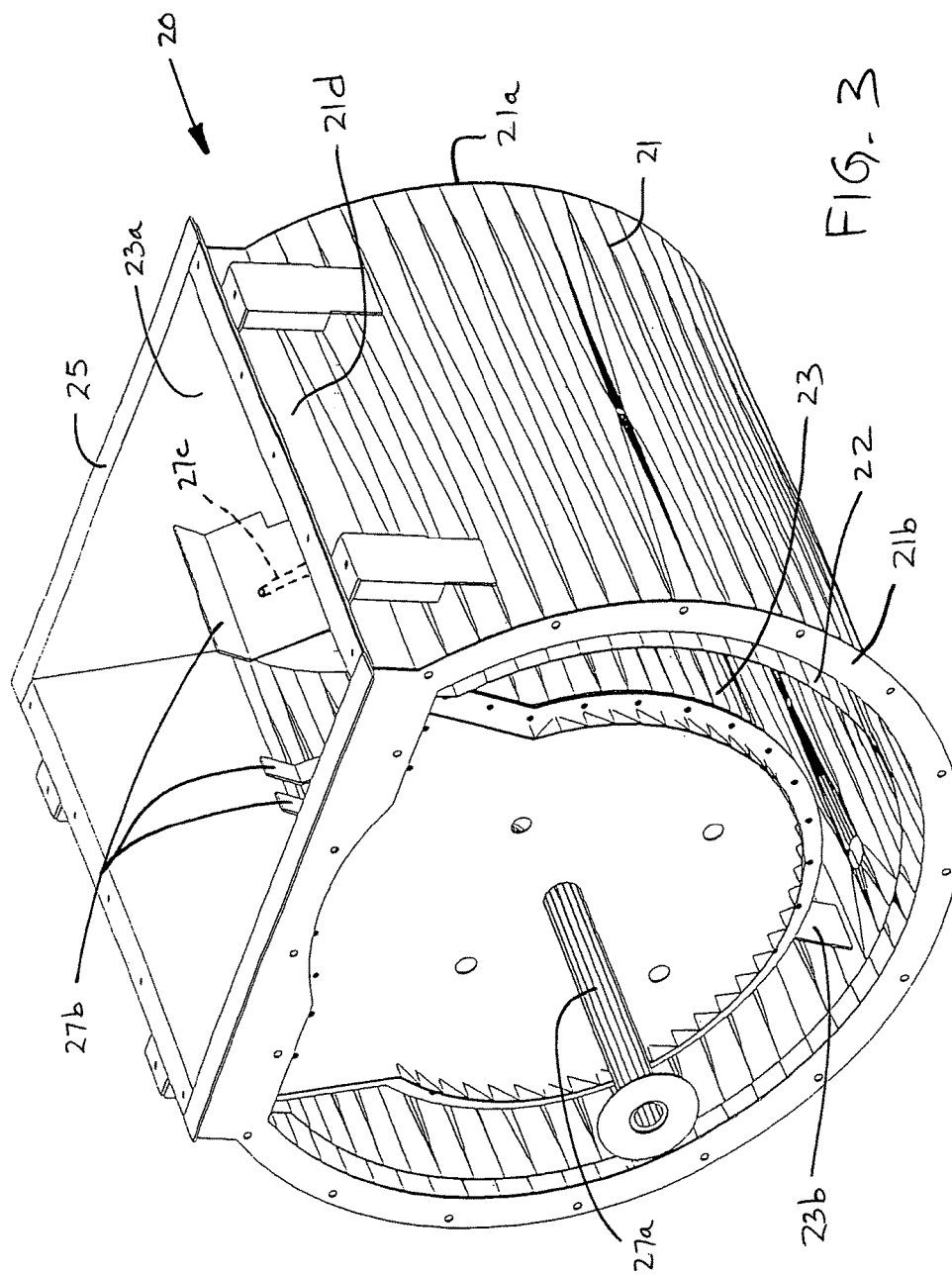
FIG. 3 is an enlarged perspective view of portions of the extraction tank illustrated in FIG. 2.

A representative embodiment of the extraction tank 20 is shown in FIGS. 2 and 3. As shown therein, the extraction tank 20 includes an outer tank portion 21, an intermediate tank portion 22, and an inner tank portion 23. In the illustrated embodiment, each of the outer tank portion 21, the intermediate tank portion 22, and the inner tank portion 23 is generally hollow and cylindrical in shape. However, the outer tank portion 21, the intermediate tank portion 22, and the inner tank portion 23 of the extraction tank 20 may be formed having any desired shape or combination of shapes.

In the illustrated embodiment, the intermediate tank portion 22 is supported generally concentrically within the outer tank portion 21 by a plurality of supports (not shown) extending therebetween. Thus, a first annular cylindrical space is defined between the intermediate tank portion 22 and the outer tank portion 21. This first annular cylindrical space can be filled with a conventional heat insulating material, for a purpose that will explained below. Similarly, the inner tank portion 23 is supported generally concentrically within the intermediate tank portion 22 by a plurality of supports 23b (only one of which is illustrated in FIG. 3). Thus, a second annular cylindrical space is defined between the inner tank portion 23 and the intermediate tank portion 22. This second annular cylindrical space can contain a plurality of heating elements 24, for a purpose that will also be explained below. In the illustrated embodiment, four of such heating elements 24 are provided in the second annular cylindrical space. However, any desired number of such heating elements 24 may be provided. For the same reason as described above in connection with the pre-heating tank 13, the heating elements 24 provided within the second annular cylindrical space are preferably embodied as electric heating elements. For reasons that will become apparent below, the inner tank portion 23 is preferably formed from a material that resistant to corrosion from contaminants and/or acidic gases that may be generated during operation of the extraction tank 20.

A first end 21a of the outer tank portion 21 is closed, while a second end 21b (see FIG. 3) of the outer tank portion 21 is opened to facilitate access to the interior space of the outer tank portion 21 if necessary. However, the opened end 21b of the outer tank portion 21 is normally closed by an end plate 21c (see FIG. 2) that can be secured thereto to define the interior space. The upper side of the outer tank portion 21 has an enlarged opening formed therethrough, and an upwardly extending flange 21d extends about such enlarged opening. The purpose for the enlarged opening and the upwardly extending flange 21d on the outer tank portion 21 of the extraction tank 20 will be explained below.

The upper side of the inner tank portion 23 also has an enlarged opening formed therethrough, and an upwardly extending flange 23a extends about such enlarged opening. Preferably, the enlarged openings provided through the upper sides of the outer tank portion 21 and the inner tank portion 23 are aligned with one another. Thus, the upwardly extending flange 23a provided about the enlarged opening through the upper side of the inner tank portion 23 extends within and adjacent to the upwardly extending flange 21d provided about the enlarged opening through the upper side of the outer tank portion 21, as shown in the drawings. Either or both of the upwardly extending flanges 21d and 23a may be provided with a laterally extending mounting surface 25. The purpose for the enlarged opening and the laterally extending mounting surface 25 will be explained below.

The extraction tank 20 additionally includes a hood portion 26 that is adapted to engage the laterally extending mounting surface 25 and to be removably secured to the extraction tank 20 in any conventional manner. When secured to the extraction tank 20, the hood portion 26 seals against the laterally extending mounting surface 25 of the extraction tank 20 in an air-tight manner. Thus, the assembly of the outer tank portion 21 and the hood portion 26 defines an air-tight enclosure for the extraction tank 20. The hood portion 26 of the extraction tank 20 may be formed having any desired shape. The hood portion 26 has one or more outlet ports 26a formed near the top thereof. In the illustrated embodiment, six of such outlet ports 26a are provided on the hood portion 26 of the of the extraction tank 20, although any desired number of such outlet ports 26a may be provided. Additionally, if desired, one or more viewing openings 26b may be formed through the hood portion 26 of the of the extraction tank 20 to facilitating viewing of the interior of the extraction tank 20 during operation. To insure that the interior space of the extraction tank 20 remains closed to the outside atmosphere, the viewing openings 26b may be closed by respective transparent panels that are sealed to the edges of the hood portion 26.

As mentioned above, the enlarged openings provided through the upper sides of the outer tank portion 21 and the inner tank portion 23 are aligned with one another. Thus, when the hood portion 26 is removed from the laterally extending mounting surface 25, a quantity of the pre-heated contaminated soil from the pre-heating tank 13 can be passed through the co-extensive upwardly extending flanges 21d and 23a of the outer tank portion 21 and the inner tank portion 23, respectively, and into the interior of the inner tank portion 23 of the extraction tank 20. When the hood portion 26 is subsequently secured to the laterally extending mounting surface 25 and the extraction tank 20, the pre-heated contaminated soil contained within the interior of the inner tank portion 23 of the extraction tank 20 can be processed in the manner described below to remove the contaminants therefrom. As will be described below, such contaminants are released from the soil into the interior of the extraction tank 20 and are not released into the atmosphere or environment in which the apparatus 10 is disposed.

The extraction tank 20 further includes a rotary agitator assembly, indicated generally at 27, for agitating the pre-heated contaminated soil that is received within the inner tank portion 23 of the extraction tank 20. As best shown in FIG. 2, the rotary agitator assembly 27 includes a hollow shaft 27a having a plurality of radially extending agitators 27b supported thereon. A motor (not shown) or other source of power is connected to the shaft 27a so as to selectively rotate the shaft 27a and the agitators 27b relative to the remainder of the extraction tank 20 when the pre-heated contaminated soil is disposed within the inner tank portion 23 and the hood portion 26 is sealed against the laterally extending mounting surface 25. As a result, the rotary agitator assembly 27 agitates the pre-heated contaminated soil, again for a purpose that will be explained in detail below. The rotary agitator assembly 27 further includes a plurality of air flow conduits 27c that, in the illustrated embodiment, are supported on the agitators 27b. Preferably, as shown in the drawings, the air flow conduits 27c are supported on the sides of the agitators 27b that face away from the direction of rotation of the rotary agitator assembly 27. Each of the air flow conduits 27c communicates with the interior of the hollow shaft 27a for a purpose that will be explained below.

Referring back to FIG. 1, it can be seen that the extraction tank 20 forms a portion of a closed loop air circulation system, indicated generally at 30. The closed loop air circulation system 30 includes an air pump 31 having an outlet that communicates through a conduit 31a with the interior of the inner tank portion 23 of the extraction tank 20. The air pump 31 can be embodied as any mechanism that produces a flow of pressurized air through the conduit 31a to the inner tank portion 23 of the extraction tank 20. Preferably, the air pump 31 provides a pulsed pressure sparging flow of pressurized air. This can be accomplished by providing a series of positive pressure air pulses generated at the outlet of the air pump 31 and a series of negative pressure air pulses that are generated at the inlet of the air pump 31. Thus, the flow of pressurized air through the conduit 31a is preferably provided in a series of discrete bursts of positive pressure air pulses generated at the outlet of the air pump 31 and by a series of discrete bursts of negative pressure air pulses generated at the inlet of the air pump 31, as opposed to a relatively constant flow of pressurized air at a relatively constant pressure. However, the flow of pressurized air from the air pump 31 may be made in any desired manner.

As mentioned above, the conduit 31a communicates with the interior of the inner tank portion 23 of the extraction tank 20. To accomplish this, the conduit 31a communicates through respective inlet ports 24a that, in the illustrated embodiment, are formed through end portions of the heating elements 24 supported on the closure plate 21c that communicate with the second annular cylindrical space defined between the inner tank portion 23 and the intermediate tank portion 22. The air flow from the conduit 31a thus flows axially through the second annular cylindrical space from the opened end 21b of the outer tank portion 21 to the closed end 21a thereof. As the air flows through this second annular cylindrical space, it is heated by the plurality of heating elements 24 disposed therein. As discussed above, the first annular cylindrical space between the intermediate tank portion 22 and the outer tank portion 21 can be filled with a conventional heat insulating material to prevent the heat generated by the heating elements 24 from raising the temperature of the outer tank portion 21, which would be both undesirable from a safety standpoint and inefficient from an energy consumption standpoint.

Thus, as mentioned above, the air flowing through this second annular cylindrical space is heated to a temperature where the contaminants in the soil are released from the soil into the extraction tank 20. The specific temperature will be determined by the nature of the contaminants that are desired to be removed from the soil. The heated air flows out of the second annular cylindrical space through one or more ports (not shown) formed through the closed end 21*a* of the outer tank portion 21. These ports communicate with a manifold (not shown) that can be supported on the closed end 21*a* of the outer tank portion 21 with the interior of the hollow shaft 27*a* of the rotary agitator assembly 27. As mentioned above, the air flow conduits 27*c* supported on the agitators 27*b* communicate with the interior of the hollow shaft 27*a*. Thus, the heated air flows out of the second annular cylindrical space and through the hollow shaft 27*a* into the interior of the inner tank portion 23. Thus, during operation, the series of positive pressure air pulses generated at the outlet of the air pump 31 is initially heated by the heating elements 24, then communicated to the interior of the inner tank portion 23, where it interacts with the contaminated soil within the extraction tank 20 as the contaminated soil is agitated therein by the rotary agitator assembly 27. The rotary agitator assembly 27 provides a means for lifting and rolling the contaminated soil within the extraction tank 20, while the air flow conduits 27*c* insure that the pulsed pressure flow of heated air is applied directly to such contaminated soil.

The closed loop air circulation system 30 also includes an analyzer 32 that communicates with the inner tank portion 23 of the extraction tank 20. To accomplish this, the outlet ports 26*a* provided on the hood portion 26 communicate through a conduit 20*a* with the analyzer 32. In the manner described in detail below, the negative pressure air pulses that are generated at the inlet of the air pump 31 draw air from the inner tank portion 23 of the extraction tank 20 to the analyzer 32. The analyzer 32 can be embodied as any device that is capable of measuring the amount or amounts of one or more desired compositions that are removed from the contaminated soil in the inner tank portion 23 of the extraction tank 20 by virtue of the heating and agitating thereof. The purpose for the analyzer 32 will be explained below.

The closed loop air circulation system 30 further includes a sediment holding tank 33, a condenser 34, a fluid holding tank 35, and a gaseous filter 36. In the illustrated embodiment, the analyzer 32 communicates through a conduit 32*a* with the sediment holding tank 33, the sediment holding tank 33 communicates through a conduit 33*a* with the condenser 34, the condenser 34 communicates through a conduit 34*a* with the fluid holding tank 35, the fluid holding tank 35 communicates through a conduit 35*a* with the gaseous filter 36, and the gaseous filter 36 communicates through a conduit 36*a* with the inlet of the air pump 31. Thus, when the air pump 31 is operated, the negative pressure air pulses that are generated at the inlet of the air pump 31 cause the air that is contained within the closed loop air circulation system 30 to flow in a closed loop through the extraction tank 20, the analyzer 32, the sediment holding tank 33, the condenser 34, the fluid holding tank 35, and the gaseous filter 36. The operations of the various components of the closed loop air circulation system 30 may be monitored and controlled by a controller 37, which may be embodied as a conventional electronic controller or microprocessor. The controller 37 may control the operations of the various components of the closed loop air circulation system 30 in any conventional manner, such as by means of a conventional control station (not shown) switches, relays, fuses, and the like connected between the controller 37 and the individual components of the closed loop air circulation system 30.

Figure 4:
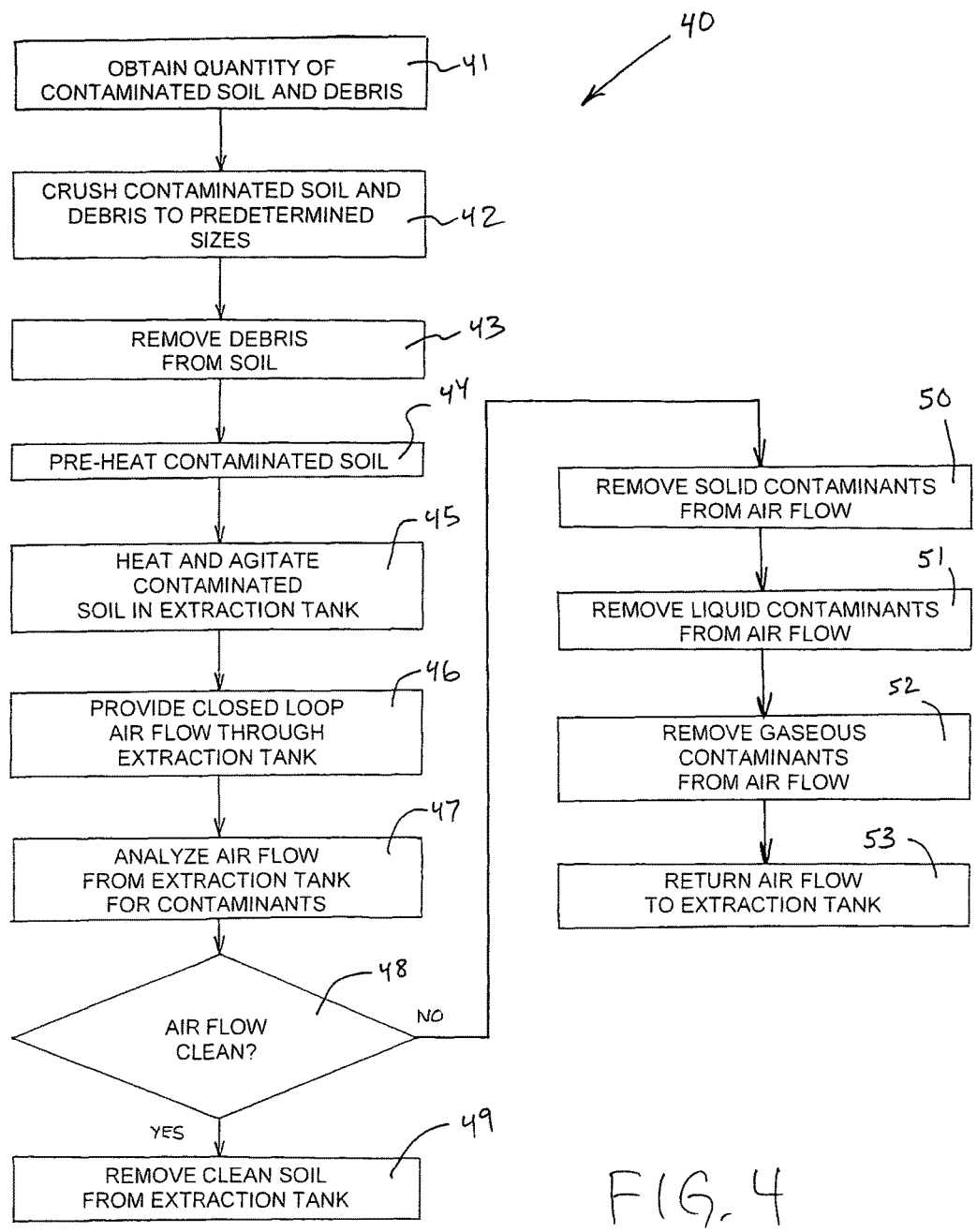
FIG. 4 is a flow chart of a method for extracting contaminants from soil in accordance with this invention.

The operation of the apparatus 10 illustrated in FIG. 1 will be explained in conjunction with a flow chart, indicated generally at 40 in FIG. 4, of the method of this invention. As discussed above, the apparatus 10 is designed to receive and process soil removed from an area of ground so as to remove any foreign debris and contaminants therefrom. As a result, the clean soil can be returned to the area of ground, and the foreign debris and contaminants removed from the soil can be safely stored or destroyed. Thus, the method of this invention begins with a first step 41, wherein a quantity of contaminated soil and debris is obtained. This quantity of contaminated soil and debris is then disposed within the crusher 11 in the manner discussed above. In a second step 42 of the method 40, the crusher 11 is operated so as to crush the quantity of contaminated soil and debris into pieces that are no larger than a predetermined size or volume. Next, the crushed contaminated soil and debris is transferred to the separator 12. In a third step 43 of the method 40, the separator 12 is operated so as to separate the non-soil foreign debris (or any portion thereof) from the contaminated soil. The non-soil foreign debris that is separated from the contaminated soil can be removed from the separator 12 and disposed of in any conventional manner, such as by storage in a landfill.

The contaminated soil is next fed from the separator 12 to the pre-heating tank 13. Thus, in a fourth step 44 of the method 40, the pre-heating tank 13 is operated to preliminarily heat the contaminated soil to a predetermined temperature. As discussed above, the purpose of the pre-heating tank 13 is to dry the contaminated soil if such contaminated soil is initially high in water content. The temperature to which the contaminated soil is preliminarily heated may be selected as desired. However, it is contemplated that the temperature of the contaminated soil is raised up to near, but not at, a magnitude where some or all the contaminants in the soil are released therefrom into the pre-heating tank 13.

The pre-heated contaminated soil is then transferred from the pre-heating tank 13 to the extraction tank 20. This can be accomplished in any desired manner, but preferably is performed by initially removing the hood portion 26 from the remainder of the extraction tank 20, thereby allowing the pre-heated contaminated soil to be inserted within the enlarged opening of the inner tank portion 23, as described above. Then, the hood portion 26 is replaced on the laterally extending mounting surface 25 of the extraction tank 20. As also described above, when secured to the extraction tank 20, the hood portion 26 seals against the laterally extending mounting surface 25 of the extraction tank 20 in an air-tight manner. Thus, the assembly of the outer tank portion 21 and the hood portion 26 defines an air-tight, fully enclosed interior for the extraction tank 20.

In a fifth step 45 in the method of this invention, the extraction tank 20 is operated so as to (1) heat the contaminated soil in presence of a positive pulsed pressure, hot air sparging flow of air to a predetermined temperature, and (2) agitate (i.e., lift and roll) the heated contaminated soil in combination with elevated air temperature and pressure and sparging to facilitate the uniform heating thereof. As a result, contaminants in the soil are released from the soil into the enclosed interior of the extraction tank 20. Because of this, the inner tank portion 23 is preferably formed from a material that resistant to corrosion from contaminants and/or acidic gases that may be generated during operation of the extraction tank 20, as discussed above.

As the contaminated soil reaches the selected temperature, the thermally enhanced soil intensifies combustible vapor, toxic vapor, inorganic vapor, organic vapor and/or gases all organized within hood portion 26. This process continues until the soil reaches a select temperature over a select period of time, where all of the encountered contaminants are released from the soil into the enclosed interior of the extraction tank 20. During this process, the rotary agitator assembly 27 is operated so as to agitate the heated contaminated soil in presence of the positive pulsed pressure, hot air sparging flow of air therethrough from the air pump 31.

As a result, as shown in the sixth step 46 of the method 40, the vaporized contaminants are carried away from the soil and from the interior of the extraction tank 20. This is accomplished by the negative pressure (i.e., vacuum) air pulses that are generated at the inlet of the air pump 31. As discussed above, the closed loop air circulation system 30 includes the analyzer 32, the sediment holding tank 33, the condenser 34, the fluid holding tank 35, and the gaseous filter 36. The negative pressure air pulses that are generated at the inlet of the air pump 31 cause air to flow out of the extraction tank 20, thereby carrying the contaminants contained in the air within the interior of the extraction tank 20 away from the soil and into the analyzer 32.

In a seventh step 47 of the method 40, the analyzer 32 is operated so as to measure the amount or amounts of one or more desired compositions that are removed from the contaminated soil in the inner tank portion 23 of the extraction tank 20 by virtue of the heating and agitating thereof. The, in an eighth step 48 of the method 40, the measurements from the analyzer 32 are fed to the controller 37 for analysis. To accomplish this, the results of the analysis performed by the analyzer 32 are fed electronically to the controller 37, which controls the operation of the other components of the apparatus 10 in response thereto. For example, if the magnitude of the compositions contained in the air flow from the extraction tank 20 measured by the analyzer 32 is above a predetermined threshold, the controller 37 continues to operate the apparatus 10 in the normal manner described above. However, when the magnitude of the measured compositions contained in the air flow from the extraction tank 20 falls below the predetermined threshold, it can be assumed that the contaminants have been removed (or at least sufficiently removed) from the soil. Thus, the method 40 branches to a ninth step 49, wherein the controller 37 causes the various components of the apparatus 10 to discontinue operation. Such discontinuance allows the quantity of remediated soil to be removed from the extraction tank 20 and allow a new quantity of contaminated soil to be disposed therein for treatment.

Assuming, however, that the magnitude of the compositions contained in the air flow from the extraction tank 20 (as measured by the analyzer 32) remains above the predetermined threshold, however, the apparatus 10 is continued to be operated. Thus, in a tenth step 50 of the method 40, any solid contaminants that are carried in the air flow from the extraction tank 20 and through the analyzer 32 are removed therefrom. The negative pressure air pulses that are generated at the inlet of the air pump 31 cause the air (and the contaminants carried therein) to flow from the analyzer 32 through the conduit 32a to the sediment holding tank 33. The sediment holding tank 33 is, of itself, conventional in the art and is adapted to remove any solids that are carried in the air flow from the extraction tank 20 and the analyzer 32. Such sediment is typically heavier than air and, therefore, drops out of the air flow from the extraction tank 20 into the sediment holding tank 33. Thus, it is desirable that that conduit 32a entering the sediment holding tank 33 and the conduit 33a exiting the sediment holding tank 33 be located physically near the upper end thereof, allowing the removed sediment to gather at the lower end of the sediment holding tank 33 under the influence of gravity. Such removed solids can be stored in the sediment holding tank 33 for subsequent disposal in any desired manner.

In an eleventh step 51 of the method 40, the air flow from the extraction tank 20, the analyzer 32, and the sediment holding tank 33 may begin to cool, causing condensation of the gaseous compositions container therein into a liquid form. It has been found to be desirable to remove such condensed liquid contaminants from the air flow. To insure that this occurs, the negative pressure air pulses that are generated at the inlet of the air pump 31 cause the air (and the contaminants carried therein) to flow from the sediment storage tank 33 through the conduit 33a to the condenser 34, and further from the condenser 34 through the conduit 34a to the fluid holding tank 35. The condenser 34 is, of itself, conventional in the art and is adapted to cool and condense the vapors that are carried in the air flow from the sediment storage tank 33. The vapors are condensed to liquid form and are deposited in the fluid holding tank 35. Such liquids are typically heavier than air and, therefore, drop out of the air flow from the condenser 34 into the fluid holding tank 35. Thus, it is desirable that that conduit 34a entering the fluid holding tank 35 and the conduit 35a exiting the fluid holding tank 35 be located physically near the upper end thereof, allowing the removed liquid to gather at the lower end of the fluid holding tank 35 under the influence of gravity. Such removed liquid contaminants can be stored in the fluid holding tank 35 for subsequent disposal in any desired manner.

In a twelfth step 52 of the method 40, any gaseous contaminants that are continued to be carried in the air flow through the extraction tank 20, the analyzer 32, the sediment storage tank 33, the condenser 34, and the fluid holding tank 35 are removed therefrom. To accomplish this, the negative pressure air pulses that are generated at the inlet of the air pump 31 cause the air (and the contaminants carried therein) to flow from the fluid holding tank 35 through the conduit 35a to the gas filter 36. The gas filter 36 is, of itself, conventional in the art and is adapted to remove any gaseous contaminants that are carried in the air flow from the fluid storage tank 35. Such removed gaseous contaminants can be stored in the gas filter 36 for subsequent disposal in any desired manner. In a final step 53 of the method 40, the air flow from the gas filter 36 is returned to the inlet of the air pump 31, thus establishing the closed loop air circulation system 30. As discussed above, the air pump 31 provides a pulsed pressure sparging flow of pressurized air through the closed loop air circulation system 30 by generating both (1) a series of positive pressure air pulses at the outlet of the air pump 31 and (2) a series of negative pressure air pulses at the inlet of the air pump 31.

The sediment holding tank 33, the fluid holding tank 35, and the gas filter 36 all function as contaminant retaining mechanisms, wherein all of the contaminants that are released from the contaminated soil are removed from the air flowing through the closed loop air circulation system 30 and stored for subsequent safe disposal. The use of the closed loop air circulation system 30 prevents any contaminants in any form (i.e., solid, liquid, or gas) from undesirably escaping into the atmosphere. As a result, the apparatus 10 is a completely self-contained system that can be used at any desired site to remediate contaminate soil in an efficient manner. If desired, the entire apparatus 10 can be supported on a single vehicular structure to facilitate its transport from site to site for convenient use.

Figure 5:
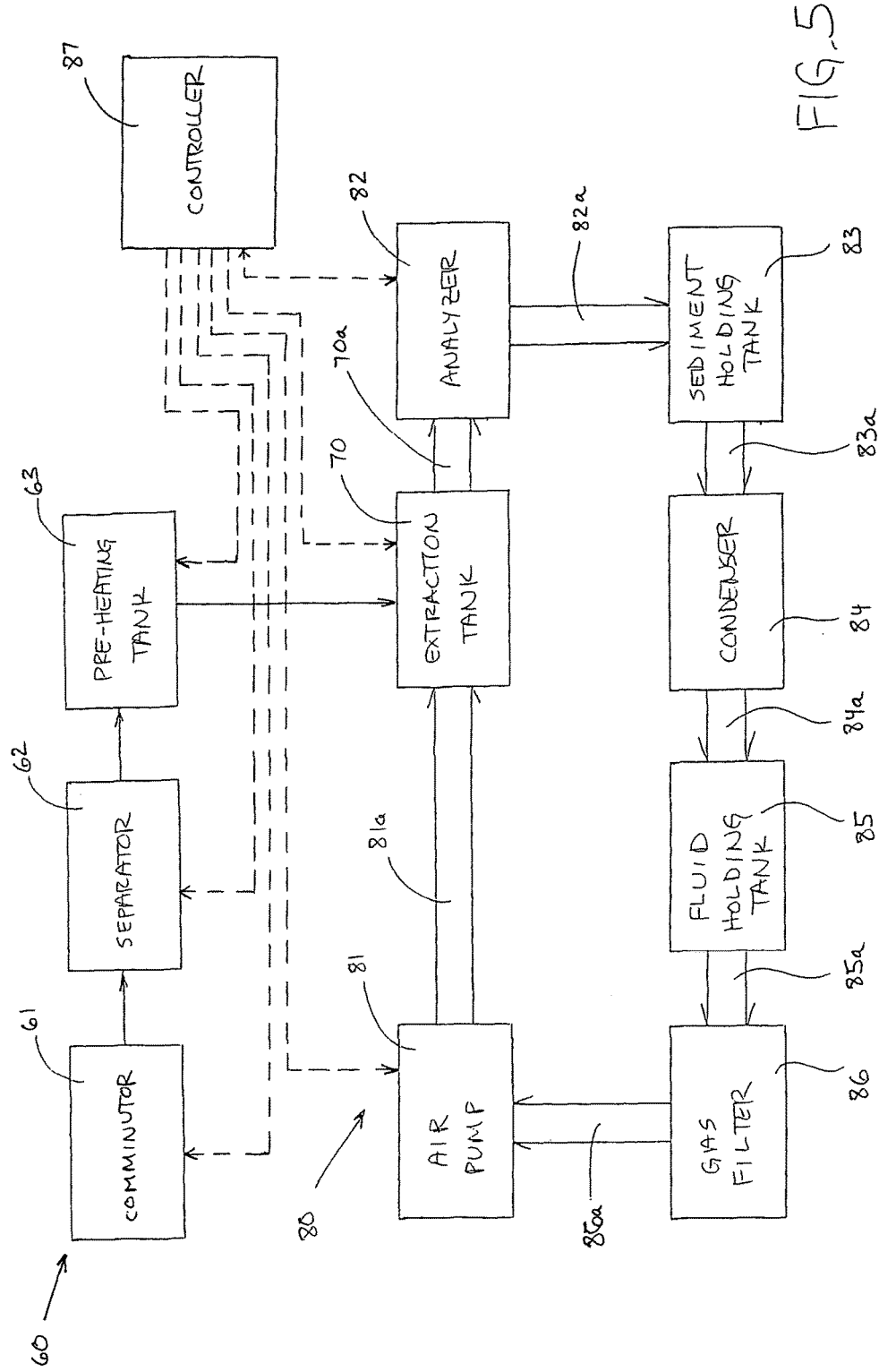
FIG. 5 is a block diagram of an apparatus for extracting contaminants from animal manure in accordance with this invention.

Referring now to FIG. 5, there is illustrated an apparatus, indicated generally at 60, for extracting contaminants from animal manure in accordance with this invention. As a result, the contaminants removed from the animal manure can be safely stored or destroyed. The apparatus 60 of this invention is particularly well suited for removing volatile organic components. The apparatus 60 can, for example, be used to extract organic constituents from animal manure sediments and sludge, including nitrogen, phosphorus, potassium, sulfur, magnesium, calcium, sodium, aluminum, boron, copper, iron, manganese and zinc. These contaminants, as well as other contaminants, can then be stored in a sealed storage tank for safe disposal or destruction. The apparatus 60 is a totally sealed system, preventing any detectable emissions from being undesirably expelled into the atmosphere.

To accomplish this, this apparatus 60 provides a thermally enhanced animal manure waste vapor extraction system with a pulsed pressure hot air sparging, rotary agitation mechanism, the structure and operation of which is, in many respects, similar to the apparatus 10 described above. This waste vapor extraction is accomplished through thermal enhancement of the animal manure, additionally with elevated temperature and pulse pressure air sparging. The pulse pressure air sparging is accomplished with hot air being circulated through the apparatus 60 in a series of positive pressure air pulses alternated with a series of negative pressure air pulses (i.e., vacuum), all incorporated into a sealed or closed loop system. The rotary agitation of the animal manure provides a way to lift and roll the animal manure in combination with elevated air temperature and sparging to extract contaminants therefrom. The lifting and rolling of the animal manure facilitates the uniform heating thereof. If desired, the entire apparatus 60 can be provided as a prefabricated unit that can be transported by flatbed trucks or other vehicle, thereby providing a highly mobile, relatively uncomplicated system that can be rapidly configured and assembled at a remote location.

As shown in FIG. 5, the apparatus 60 of this invention includes a comminutor 61 that is adapted to receive a quantity of animal manure (not shown) therein. The comminutor 61 may be embodied as any mechanism that is capable of breaking down the animal manure into its component parts. Specifically, the comminutor 61 breaks down the solid and fiber materials in the animal manure to a select component size. The quantity of animal manure can be transported to and disposed within the comminutor 61 in any desired manner. For example, the quantity of animal manure can be transported to and disposed within the comminutor 61 by means of a conventional bucket, auger or conveyor. The comminutor 61 can process the quantity of animal manure through a screen (not shown), where the size or volume of the pieces can be precisely controlled.

The apparatus 60 also includes a separator 12, which receives the animal manure from the comminutor 61. The separator 62 may be embodied as any mechanism that is capable of separating the solid manure fibers from the liquid components thereof. For example, the separator 62 may be formed from a screen having a predetermined mesh size, wherein the relatively large animal manure solids and fibers are extracted from the liquid components, thus leaving a slurry of animal manure. The relatively large animal manure solids and fibers can be removed from the separator 62 and stored or disposed of in any conventional manner, such as by use as a fertilizer. By separating the solid manure fibers, it becomes possible to stack the relatively large solids and fibers of the animal manure, thereby enhancing effective composting, reducing odors, and lowering pollution potential.

The apparatus 60 further includes a pre-heating tank 63, which receives the slurry of animal manure from the separator 62. The pre-heating tank 63 may be embodied as any mechanism that is capable of preliminarily heating the slurry of animal manure to a predetermined temperature. The purpose of the pre-heating tank 63 is to cause the slurry of animal manure to expel methane gas therefrom. To accomplish this, the pre-heating tank 63 may include one or more electric heating elements, such as described above in connection with the pre-heating tank 13. For example, it has been found to be desirable to preliminarily heat the slurry of animal manure to a temperature of approximately 105° F. or higher to expel the methane gas therefrom. The removal of such methane gas is desirable to control foaming of the slurry of animal manure. The methane gas can be stored in a tank (not shown) for later use.

The apparatus 60 additionally includes an extraction tank 70 that receives the pre-heated slurry of animal manure from the pre-heating tank 63. The extraction tank 70 may be embodied as any mechanism that is (1) capable of heating the slurry of animal manure in presence of a pulsed pressure, hot air sparging flow of air to a predetermined temperature, and (2) agitating the heated slurry of animal manure in combination with elevated air temperature and sparging to facilitate the uniform heating thereof. As a result, contaminants in the slurry of animal manure are released therefrom into the enclosed interior of the extraction tank 70. The structure of the extraction tank 70 can be the same as the extraction tank 20 described above.

The extraction tank 70 forms a portion of a closed loop air circulation system, indicated generally at 80. The closed loop air circulation system 80 includes an air pump 81 that communicates through a conduit 81*a* with the interior of the inner tank portion (not shown) of the extraction tank 70. The closed loop air circulation system 80 also includes an analyzer 82 that communicates with the inner tank portion (not shown) of the extraction tank 70. The closed loop air circulation system 80 further includes a sediment holding tank 83, a condenser 84, a fluid holding tank 85, and a gaseous filter 86. In the illustrated embodiment, the analyzer 82 communicates through a conduit 82*a* with the sediment holding tank 83, the sediment holding tank 83 communicates through a conduit 83*a* with the condenser 84, the condenser 84 communicates through a conduit 84*a* with the fluid holding tank 85, the fluid holding tank 85 communicates through a conduit 85*a* with the gaseous filter 86, and the gaseous filter 86 communicates through a conduit 86*a* with the air pump 81.

Thus, when the air pump 81 is operated, the air contained within the closed loop air circulation system 80 is caused to flow in a closed loop through the extraction tank 70, the analyzer 82, the sediment holding tank 83, the condenser 84, the fluid holding tank 85, and the gaseous filter 86 in the manner described above. The operations of the various components of the closed loop air circulation system 80 may be monitored and controlled by a controller 87, which may be embodied as a conventional electronic controller or microprocessor. The controller 87 may control the operations of the various components of the closed loop air circulation system 80 in any conventional manner, such as by means of a conventional control station (not shown) switches, relays, fuses, and the like connected between the controller 87 and the individual components of the closed loop air circulation system 80. The closed loop air circulation system 80 operates in essentially the same manner as described above in connection with the closed loop air circulation system 30 to remove contaminants from the slurry of animal manure. Unlike the apparatus 10 described above, however, the liquid that is stored in the fluid holding tank 85 is reclaimed water that can be used without any adverse environmental effects.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An apparatus for extracting contaminants from a contaminated material comprising:
   an extraction tank having an interior that is adapted to receive a contaminated material, said extraction tank including a heating element that is adapted to heat the contaminated material to a temperature where contaminants in the contaminated material are released therefrom to said interior of said extraction tank, said extraction tank further including an agitator that is adapted to agitate the contaminated material as it is being heated by the heating element;
   an air pump that, during operation, is capable of generating a series of positive pressure air pulses at an outlet thereof and a series of negative air pulses at an inlet thereof, the air pump outlet being fluidly connected to at least one air flow conduit supported on the agitator in the extraction tank; and
   one or more contaminant retainers;
   said interior of said extraction tank, said air pump, and said one or more contaminant retainers being connected in a closed loop air circulation system such that the contaminants that are released from the contaminated material are stored in the one or more contaminate retainers,
   wherein the air pump causes pulse pressure air sparging to be performed on the contaminated material contained within the extracting tank by circulating hot air through the air flow conduit in the extraction tank.

2. The apparatus defined in claim 1 further including an analyzer that is connected in said closed loop air circulation system and measures the amount of contaminants that are removed from the contaminated material.

3. The apparatus defined in claim 2 further including a controller that is responsive to said analyzer for controlling the operation of said extraction tank and said air pump.

4. The apparatus defined in claim 1 wherein said one or more contaminant retainers includes at least one of a sediment holding tank, a fluid holding tank, and a gas filter.

5. The apparatus defined in claim 1 wherein said one or more contaminant retainers includes all of a sediment holding tank, a fluid holding tank, and a gas filter.

6. The apparatus defined in claim 1 further including a crusher that breaks up the contaminated material into pieces that are no larger than a predetermined size or volume, a separator that receives the crushed contaminated material and separates any foreign debris therefrom, and a pre-heating tank for heating the crushed and separated contaminated material to a predetermined temperature and for delivering the crushed, separated, and pre-heated contaminated material to said extraction tank.

7. The apparatus defined in claim 1 wherein said further including a comminutor that breaks down the contaminated material into its component parts, a separator that receives the comminuted contaminated material and separates solid components from liquid components thereof, and a pre-heating tank for heating the comminuted and separated contaminated material to a predetermined temperature and for delivering the comminuted, separated, and pre-heated contaminated material to said extraction tank.

8. The apparatus defined in claim 1 wherein said contaminated material is contaminated soil.

9. The apparatus defined in claim 1 wherein said contaminated material is manure.

10. A method for extracting contaminants from a contaminated material comprising:
    (a) providing an extraction tank having an interior;
    (b) providing a contaminated material within the extraction tank;
    (c) heating the contaminated material to a temperature where contaminants in the contaminated material are released therefrom to the interior of the extraction tank;
    (d) agitating the contaminated material as it is being heated by the heating element;
    (e) causing an air pump to generate a series of positive pressure air pulses at an outlet thereof and a series of negative pressure air pulses at an inlet thereof;
    (f) sparging the contaminated material contained within the extraction tank with circulating hot air through the tank using the series of positive and the series of negative air pulses generated by the air pump;
    (g) providing one or more contaminants retainers; and
    (h) connecting the interior of the extraction tank, the air pump, and the one or more contaminant retainers in a closed loop air circulation system such that the contaminants that are released from the contaminated material are stored in the one or more contaminant retainers.

11. The method defined in claim 10 including a further step (h) of measuring the amount of contaminants that are removed from the contaminated material.

12. The method defined in claim 10 including a further step (i) of controlling the operation of the extraction tank and the air pump in response to the amount of contaminants that are removed from the contaminated material.

13. The method defined in claim 10 wherein step (f) is performed by providing at least one of a sediment holding tank, a fluid holding tank, and a gas filter.

14. The method defined in claim 10 wherein step (b) is performed by providing breaking up the contaminated material into pieces that are no larger than a predetermined size or volume, separating any foreign debris from the crushed contaminated material, heating the crushed and separated contaminated material to a predetermined temperature, and delivering the crushed, separated, and pre-heated contaminated material to said extraction tank.

15. The method defined in claim 10 wherein step (b) is performed by breaking down the contaminated material into its component parts, separating the solid components of the broken-down material from liquid components thereof, heating the broken-down and separated contaminated material to a predetermined temperature, and delivering the broken-down, separated, and pre-heated contaminated material to said extraction tank.

* * * * *